United States Patent Office 3,737,463
Patented June 5, 1973

3,737,463
RESOLUTION OF OPTICALLY ACTIVE PROPYLENE GLYCOL AND CERTAIN KETONES
William L. Howard and Joanne D. Burger, Lake Jackson, Tex., assignors to The Dow Chemical Company, Midland, Mich.
No Drawing. Filed Oct. 29, 1968, Ser. No. 771,666
The portion of the term of the patent subsequent to Jan. 20, 1987, has been disclaimed
Int. Cl. C07c 31/20, 49/30, 49/36
U.S. Cl. 260—587   6 Claims

ABSTRACT OF THE DISCLOSURE

Optically active propylene glycol and optically active ketones are produced by condensing propylene glycol with a cyclic ketone having an asymmetric center, one of the reactants being optically active, to form a mixture of diastereoisomers of a cyclic ketal, separating one of the diastereoisomers by fractional crystallization and hydrolyzing the separated diastereoisomer to recover the optically active propylene glycol or ketone.

BACKGROUND OF THE INVENTION

Our patent application, Ser. No. 647,925, filed June 22, 1967, now U.S. Pat. No. 3,491,152, the disclosure of which is hereby incorporated by reference, discloses the isolation of optically active propylene glycol and optically active ketones by the process of condensing either an optically active propylene glycol or an optically active ketone having an asymmetric center with a racemic mixture of the other reactant to form a cyclic ketal, separating one of the four diastereoisomers thus formed by fractional distillation and hydrolyzing the separated diastereoisomer to recover the desired optical isomer.

The separation of the four diastereoisomers by fractional distillation is tedious and requires expensive equipment.

SUMMARY OF THE INVENTION

This invention comprises an improvement in the process described in our patent application, Ser. No. 647,925, filed June 22, 1967, now U.S. Pat. No. 3,491,152 wherein the improvement involves fractional crystallization of one of the four diastereoisomers formed by the condensation of propylene glycol with a ketone having an asymmetric carbon atom. Because of the close similarity in the properties of all four diastereoisomers, it was wholly unexpected that one diastereoisomer could be separated by fractional crystallization.

Either optically active propylene glycol or an optically active cyclic ketone having one asymmetric center is reacted with a racemic mixture of the other reactant according to the following general formula:

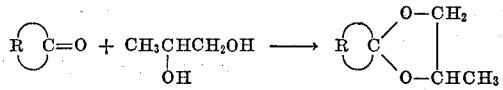

wherein

represents the residue from the ketone obtained by removal of the carbonyl group.

Because the formation of this cyclic structure renders the carbonyl carbon atom of the ketone asymmetric, the ketal contains three asymmetric centers. Since one of the reactants is optically active, only two asymmetric centers are racemic; thus, four diastereoisomers are formed.

If the optically active reactant is (1) and is called $R_1$, the racemic reactant called $R_2$ and the asymmetric carbon atom originating from the carbonyl group is called K, the four diastereoisomers can be represented as follows:

| Compound No.: | $R_1$ | $R_2$ | K |
|---|---|---|---|
| 1 | 1 | d | d |
| 2 | 1 | d | 1 |
| 3 | 1 | 1 | d |
| 4 | 1 | 1 | 1 |

A similar set of four compounds is produced when $R_1$ is (d).

The mixture of the four diastereoisomers produced by the condensation is dissolved in an inert organic solvent and cooled to a suitably low temperature. One of the diastereoisomers is then separated by fractional crystallization.

The propylene moiety of the ketal may be provided by either propylene glycol or propylene oxide. When the resolution of the ketone is sought, optically active propylene glycol must be used to form the ketal.

The ketone moiety of the ketal may suitably be a cyclic ketone having one asymmetric center and up to 20 carbon atoms or more. Preferred ketones are menthone and camphor. When optically active propylene glycol is desired, the ketone reactant must be optically active; either the pure d- or l-form is acceptable.

The concentration of desired diastereoisomer in the mixture may be as little as 10%. However, concentrations of at least 25% are preferred, and the best results are obtained with concentrations of 50% or more. To start with these higher concentrations of the desired diastereoisomer, the mixture of the ketals in the reaction product must be partially separated prior to fractional crystallization. Mixtures containing 20–90% of the diastereoisomer to be crystallized may be conveniently produced by fractional distillation.

The organic solvent used to dissolve the mixture of ketals may be for example, petroleum ether, pentane, hexane, cyclohexane, heptane, isooctane and the like. The proportion of the solvent may suitable range from 0.1 to 5 volumes based on the volume of the ketals. Below 0.1 there is usually too little liquid phase for convenient filtration, and above 5 gives too little recovery because of the solubility of the ketals. The preferred range is from 0.5 to 2 volumes of solvent per volume of the ketal mixture.

The temperature range for the fractional crystallization of the present invention is dependent upon the diastereoisomers to be separated. For propylene glycol menthone ketal the temperature may range from −1° C. down to about −80° C. At temperature above −1° C. the pure isomer cannot be crystallized because this range is above its melting point. At temperatures below −80° C. the high viscosity of the liquid ketal isomers makes handling and separation difficult. The preferred temperature range when working with this ketal is from −5° C. to −30° C. For separation of other ketals by this process, similar limitation are incurred. The temperature cannot be raised above the melting point of the pure isomer nor can the temperature be lowered to such an extent that the viscosity of the mixture creates barriers to handling and separation.

Crystallization of the ketal is induced by seeding, scratching or other means. Crystallization may be induced by scratching in almost any mixture in which crystallization can be induced by seeding. The crystals may be collected by filtering, centrifuging or other mechanical means. The other three diastereoisomeric ketals either remain in solution or are present in a separable liquid phase.

DETAILED DESCRIPTION OF THE INVENTION

The reaction whereby a cyclic ketal is made by a condensation of a ketone with a glycol is well known. Some of the processes by which this reaction is accomplished are set out in our prior application, Ser. No. 647,925, filed June 22, 1967, now U.S. Pat. No. 3,491,152. By the process of that invention, a mixture of the four diastereoisomers of $l$-menthone and racemic propylene glycol was prepared and the concentration of the lowest boiling isomer was increased by fractional distillation. The diastereoisomers were continuously reequilibrated during distillation by acidifying the mixture with p-toluene-sulfonic acid. Thus, the asymmetric carbon atom originating from the carbonyl of the ketone is continuously racemized so that substantially all of the isomers containing $d$-propylene glycol are removed.

After increasing the concentration of the lowest boiling diastereoisomer by fractional distillation, further separation of this isomer was accomplished by the process of the present invention using fractional crystallization. It is only a coincidence that the lowest boiling diastereoisomer concentrated in the distillate is the first to crystallize; if a higher boiling isomer is fractionally crystallized, a different isomer is thus recovered.

After the diastereoisomer has been separated from the mixture by fractional crystallization, it is hydrolyzed and the optically active propylene glycol isolated. The hydrolysis is suitably accomplished in an acidified mixture of water and isopropyl alcohol. The products of the hydrolysis are conveniently separated by the addition of benzene to the reaction mixture. Optically active propylene glycol is recovered from the aqueous phase and the menthone or ketone from the benzene phase.

EXAMPLE 1

The four diastereoisomers produced by the reaction between $l$-menthone and racemic propylene glycol were partially separated by fractional distillation so that 85% of the distillate was the lowest boiling $d$-propylene glycol $l$-menthone ketal and 15% was the other three acetals. 300 ml. of this distillate was dissolved in 600 ml. of petroleum ether and the solution was cooled to $-78°$ C. This cooled solution was seeded with a crystal of the lowest boiling $d$-propylene glycol $l$-menthone acetal, stirred for one hour at $-78°$ C. and filtered. The crystals were washed with fresh petroleum ether at $-78°$ C. and pressed. The melted crystals gave 100 ml. of solution which was 90% ketals and 10% solvent. Of the ketal portion, 98% was the lowest boiling $d$-propylene glycol $l$-menthone ketal and 2% was the other three isomers.

EXAMPLE 2

To the filtrate of Example 1, one liter of a mixture of ketals containing 40% of the lowest boiling $d$-propylene glycol $l$-menthone ketal and 60% of the other three disastereoisomers was added. The mixture was cooled to $-78°$ C., seeded with a crystal of the lowest boiling $d$-propylene glycol $l$-menthone ketal, stirred for one and one-half hours at $-78°$ C. and filtered. The melted crystals gave 600 ml. of solution which was 80% ketals and 20% solvent. Of the ketal portion, 80% was the lowest boiling $d$-propylene glycol $l$-menthone ketal and 20% was the other three isomers.

EXAMPLE 3

A mixture of the ketals produced by the reaction between $l$-menthone and racemic propylene glycol was fractionally distilled until the distillate contained 70% of the lowest boiling $d$-propylene glycol $l$-methone ketal and 30% of the other three diastereoisomers. 600 ml. of this distillate was added to 750 ml. of petroleum ether, and this solution was treated as in Example 2. The melted crystals gave 200 ml. of a solution which was 80% ketals and 20% solvent. Of the ketal portion, 90% was the lowest boiling $d$-propylene glycol $l$-menthone ketal and 10% was the other three isomers.

By the process of Example 1, $d$-menthone, $d$- or $l$-camphor and other optically active ketones may be reacted with racemic propylene glycol and one diastereoisomer may be separated by fractional crystallization.

Also, by the process of Example 1 a racemic ketone may be resolved by reaction with $d$- or $l$-propylene glycol and separation of the resulting mixture of 4 isomeric ketals by fractional crystallization.

We claim:
1. The process for obtaining an optically active isomer of propylene glycol comprising
  (a) condensing an optically active isomer of a ketone selected from the group consisting of camphor and menthone with propylene oxide or racemic propylene glycol to form a mixture of four diastereoisomeric cyclic ketal isomers;
  (b) dissolving said mixture of diastereoisomers in an inert organic solvent;
  (c) cooling and separating one of said diastereoisomers by fractional crystallization; and
  (d) hydrolyzing the diastereoisomer separated and recovering the optically active form of the original racemic reactant from the hydrolyzate.

2. The process for resolving the optical isomers of a racemic mixture of a cyclic ketone selected from the group consisting of camphor and menthone comprising,
  (a) condensing said cyclic ketone with an optically active isomer of $l$-propylene glycol to form a mixture of four diastereoisomeric cyclic ketal isomers;
  (b) dissolving said mixture of diastereoisomers in an inert organic solvent;
  (c) cooling and separating one of said diastereoisomers by fractional crystallization; and
  (d) hydrolyzing the diastereoisomer separated and recovering the optically active form of the original racemic reactant from the hydrolyzate.

3. The process of claim 1 wherein the reactant is racemic propylene glycol.

4. The process of claim 1 wherein the ketone is $l$-menthone.

5. The process of claim 1 wherein the ketone is $d$-camphor.

6. The process defined in claim 4 wherein the mixture of the diastereoisomers of propylene glycol $l$-menthone ketal is fractionally crystallized within the temperature range of $-1°$ C. to $-80°$ C.

References Cited

UNITED STATES PATENTS 3,491,152   1/1970   Howard et al.   260—586 A

OTHER REFERENCES

Kirk-Othmer: "Encyclopedia of Chemical Technology," vol. 6, pp. 484–488, second edition, 1965.

Weissberg: "Technique of Organic Chemistry," vol. III, pp. 422–8 (1950).

LEON ZITVER, Primary Examiner

N. MORGENSTERN, Assistant Examiner

U.S. Cl. X.R.

260—588, 637 R, 340.9